United States Patent [19]
Tomaselli

[11] Patent Number: 6,073,510
[45] Date of Patent: Jun. 13, 2000

[54] GEAR-DRIVE ASSEMBLY

[75] Inventor: Luigi Tomaselli, Turin, Italy

[73] Assignee: Fiatavio S.p.A., Turin, Italy

[21] Appl. No.: 09/215,143

[22] Filed: Dec. 18, 1998

[30] Foreign Application Priority Data

Dec. 23, 1997 [IT] Italy .................................. MI97A2856

[51] Int. Cl.⁷ .............................. F16H 1/12; F16H 57/00
[52] U.S. Cl. .................................................. 74/416; 74/410
[58] Field of Search ............................... 74/410, 416, 417

[56] References Cited

U.S. PATENT DOCUMENTS

| | | | |
|---|---|---|---|
| 1,040,443 | 10/1912 | Signor | 74/410 |
| 2,479,406 | 8/1949 | Rapuano . | |
| 3,727,574 | 4/1973 | Bagge . | |
| 4,266,436 | 5/1981 | Reppert | 74/410 X |
| 4,297,907 | 11/1981 | Bossler, Jr. et al. . | |
| 4,339,962 | 7/1982 | Babel | 74/411 X |
| 4,437,355 | 3/1984 | Bordat . | |
| 5,149,311 | 9/1992 | Luijten . | |
| 5,178,028 | 1/1993 | Bossler, Jr. . | |
| 5,233,886 | 8/1993 | Bossler, Jr. . | |
| 5,307,704 | 5/1994 | Muller et al. | 74/411 |
| 5,807,202 | 9/1998 | Sammataro | 74/416 X |

FOREIGN PATENT DOCUMENTS 29707968  11/1997  Germany .

*Primary Examiner*—Charles A Marmor
*Assistant Examiner*—Roger Pang
*Attorney, Agent, or Firm*—Stevens, Davis, Miller & Mosher, L.L.P.

[57] ABSTRACT

A gear-drive assembly between an input shaft (17, 117) and an output shaft (10, 110) comprises a ring gear (12, 112) having a peripheral portion provided with corresponding and opposite toothings (14, 15, 114, 115) on the two faces thereof. Meshing with each toothing (14, 15, 114, 115) is a pinion of a pair of pinions (16, 25, 116, 125) carried by parallel shafts (17, 22, 117, 122) interconnected with each other by a driving gear (20, 21, 120, 121) to rotate at the same speed and in opposite ways. One of said parallel shafts is the power-input shaft (17, 117). The ring gear (12, 112) is carried by the output shaft (10, 110) in a floating manner to vary the distance of its toothings (14, 15, 114, 115) from the axis of the pinions (16, 25, 116, 125).

17 Claims, 3 Drawing Sheets

GEAR-DRIVE ASSEMBLY

BACKGROUND OF THE INVENTION

The present invention relates to a driving gear in which the incoming torque is divided according to different paths of travel through the driving gears. In these driving gears, of typical aeronautical use but suitable for any application, use of gears of the type commonly known as "face gears" has been proposed, the geometry of which enables a ring gear to mesh with cylindrical pinions having their axis perpendicular to the ring gear axis. One example of this type of driving gears is for instance illustrated in U.S. Pat. No. 4,437,355, where several traditional bevel gears are adopted. One pinion carried by the power-input shaft meshes with two coaxial and facing ring gears also meshing with a second pinion rotating around an axis coplanar with the axis of the first pinion. The first pinion is mounted in a floating manner, so that the torque applied to its shaft is equally distributed between the two ring gears, in spite of the existence of definite size tolerances of the meshing teeth. U.S. Pat. No. 5,233,886 discloses a driving gear substantially having the same kinematic diagram as the one shown in the above-mentioned patent, in which gears of the "face gear" type are used. Known driving gears, as pointed out, enable a transmission of power distributed in accordance with different paths of travel, but they are rather bulky, heavy and of complicated accomplishment.

It is an object of the present invention to provide a driving gear of the type having a multiple power transmission path of travel, which is light-in-weight and of reduced bulkiness so that it is particularly, although not exclusively, useful in aeronautical constructions.

SUMMARY OF THE INVENTION

In accordance with the invention a gear drive assembly between an input shaft and an output shaft comprises a ring gear having a peripheral portion carrying corresponding and opposite toothings on the two faces thereof, one pinion of a pair of pinions carried by parallel shafts interconnected with each other by a driving gear to rotate at the same speed and in opposite ways meshing with each toothing, one of said parallel shafts being the input shaft, the ring gear being carried by the output shaft in a floating manner for varying the distance of its toothings from the pinion axis.

BRIEF DESCRIPTION OF THE DRAWINGS

For better illustrating the informative principles of the present invention, an embodiment thereof will be diagrammatically illustrated hereinafter by way of non-limiting example, as shown in the accompanying drawings.

DETAILED DESCRIPTION OF THE INVENTION

Figure 1:
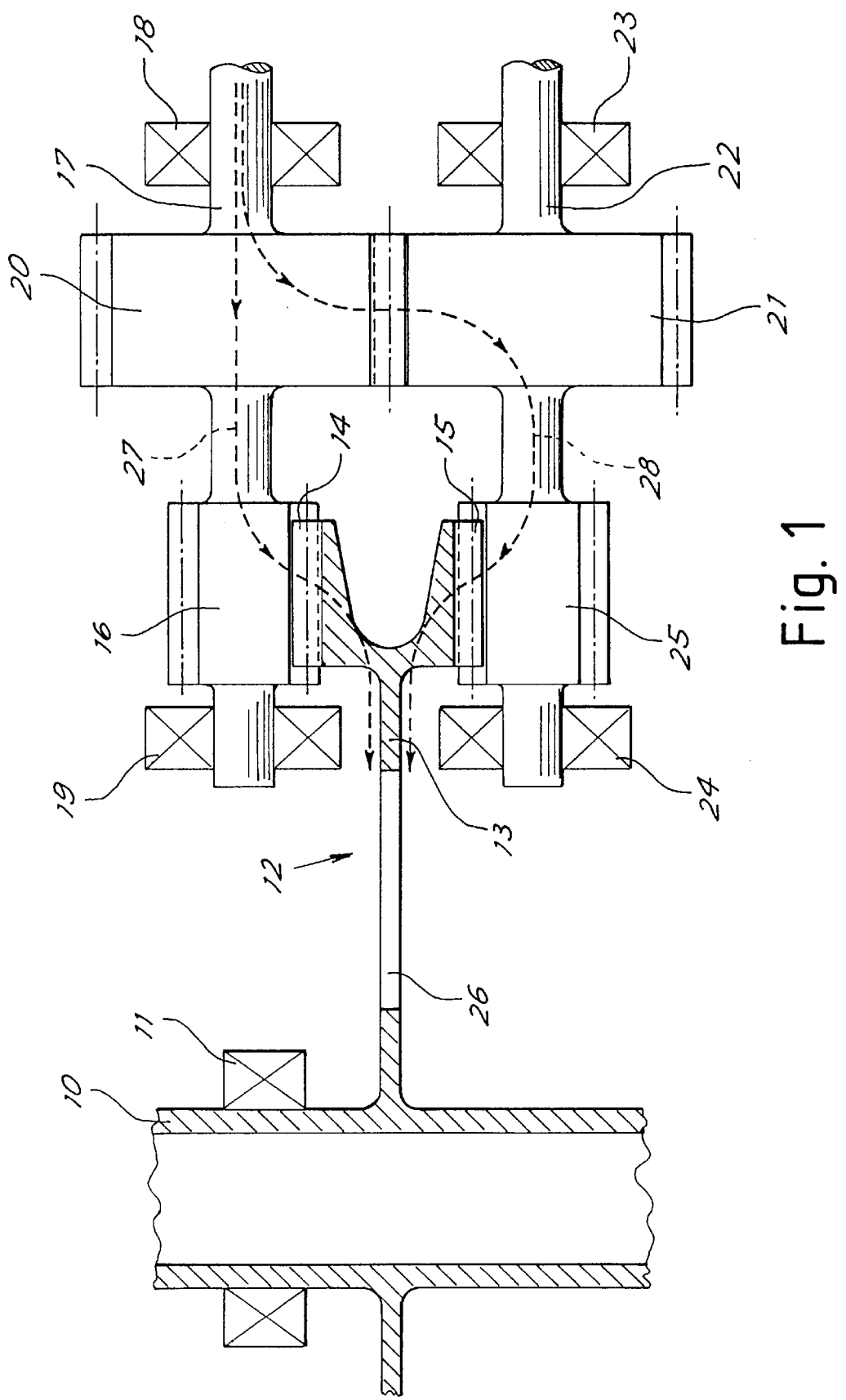
FIG. 1 is diagrammatic partial view of a gear-drive assembly in accordance with the invention.

With reference to FIG. 1, the gear-drive assembly shown comprises a shaft 10 supported at 11 and carrying a ring gear generally identified by 12. This ring gear is formed of an annular wall 13 peripherally carrying two corresponding and opposite toothings 14 and 15 of the "face gear" type.

Figure 2:
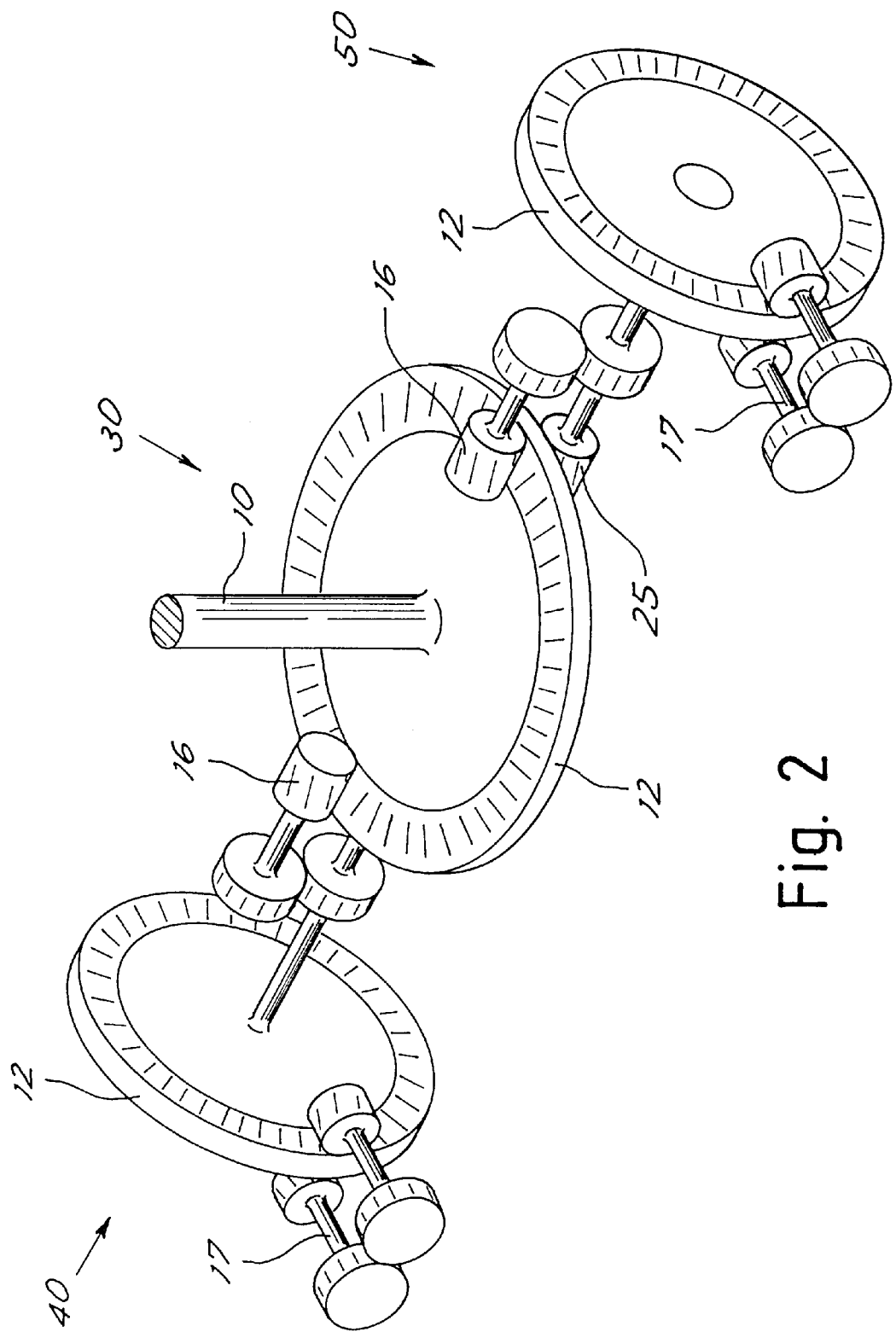
FIG. 2 shows how assemblies as the one shown in FIG. 1 can be interconnected.

Meshing with toothing 14 of the ring gear 12 is a cylindrical pinion 16 carried by a shaft 17 rotating in bearings 18, 19. Integral with shaft 17 is a gear 20 meshing with a gear 21 integral with a shaft 22 supported by bearings 23, 24. Integral with shaft 22 is a pinion 25 meshing with toothing 15 of the ring gear 12. The gear ratio of the pair of wheels 20, 21 is equal to one, so that the two parallel shafts 17, 22 rotate in opposite directions at the same speed. As shown by FIGS. 1 and 2, the toothings 14, 15, of each ring gear face, perpendicularly face the cylindrical pinions 16, 25 respectively, when the respective face gear and pinion mesh, and the cylindrical pinions 16, 25 have toothings which face perpendicularly to each ring gear face, respectively, when the respective face gear and pinion mesh. As also shown in FIGS. 1 and 2, the toothings 14, 15 of each ring face perpendicularly extend from each face of the face gear in a direction parallel to the longitudinal axis of the shaft 10.

For graphic-clearness purposes, the box holding the driving gear, in which the shaft-support bearings are mounted, is not shown.

The annular wall 13 of the ring gear 12 is provided with flexibility to enable the peripheral portion carrying toothings 14, 15 to float transversely of its extension.

To increase flexibility of wall 13, openings diagrammatically shown at 26 can be provided therein. Shaft 17 is to be considered as the motion-input shaft, i.e. the shaft driven by a motor not shown, and shaft 10 as the power-taking up shaft, downstream of the driving gear.

Taking into account the fact that both pinions 16, 25 are driven in motion through the driving gear 20, 21, the whole torque applied to shaft 17 is distributed between the two pinions. Distribution of the torque is ensured by the possibility of crowns 14, 15 of moving close to or away from the pinions through the flexibility of the annular wall 13. If, due to working tolerances, a tighter meshing of one of the pinions with the corresponding ring gear occurs, so that the torque transmitted by coupling of the other pinion with the corresponding ring gear should be decreased, the axial thrust to which the ring gear toothing transmitting the greater tangential force is subjected would be correspondingly higher than the axial thrust to which the other toothing is subjected, so that a flexure of wall 13 is caused which equalizes said axial thrusts.

In other words, since the axial thrusts to which the ring gear toothings are subjected are a function of the tangential transmission forces of movement by the pinions, the balance between the axial thrusts caused by the flexibility of wall 13 also determines the balance of the tangential forces and therefore of the torques transmitted from each of the pinions 16, 25 to toothings 14, 15. The reaction torque produces the axial displacement of toothing 14, 15.

Denoted by 27 and 28 in FIG. 1 are the paths of travel of 50% of the torque between the input shaft 17 and output ring gear 12.

The operating features of the driving gear in accordance with the invention lead to important results.

It is to note that the ring gear shaft 10 is not subjected to considerable axial loads, because thrusts on toothings are balanced by the possibility of the toothings themselves to float.

For the sake of simplicity and clearness in the description and drawing, the floating support of the toothings has been shown in the drawing as consisting of an elastically deformable wall 13. At all events, it is apparent to a person skilled in the art that many variations to this embodiment can be provided. To be taken into account is the fact that wall 13 constitutes a link between shaft 10 and toothings 14, 15 which will give rise to a turning connection while leaving toothings free to axially move with respect to the shaft 10 itself.

Due to the limited movement required from toothings 14, 15 to keep a symmetric coupling with the pinions, a technician will be addressed to the use of deformable elements rather than to sliding couplings. However, any mechanical connection performing such a function is to be considered as interchangeable with the flexible wall 13, still being within the scope of the present invention. However, the two toothings 14, 15 can be brought to a single element, thereby giving rise to an important saving in weight in the driving gear, as compared with driving gears providing two facing ring gears both meshing with a floating pinion, and in addition the axial bulkiness at the shaft 10 is reduced.

It is also to note that the radial thrusts to which pinions 16, 25 are subjected are equal to each other. As a result of this, the driving gear-holding box will be required to withstand these forces at the limited areas where the bearings of shafts 17, 22 are mounted, without the whole support structure of the gear-drive assembly being involved.

Shaft 22 can be idler, being only intended for receiving gears 21 and 25. However, movement can possibly be taken therefrom for optional uses as often required in some applications, above all in the helicopter field.

Due to the structure of the gear-drive assembly in accordance with the invention, different possible applications involving combination of more than one assembly can be envisaged.

For example, FIG. 2 shows how three gear-drive assemblies in accordance with the invention can be combined together to obtain a cascade reduction train. Each gear-drive assembly is denoted as a whole by reference numerals 30, 40 and 50 and the individual elements thereof have the same reference numerals as used in FIG. 1.

Acting with the opposite toothings of the ring gear 12 of the central assembly 30 are the pinion pairs 16, 25 of the assemblies 40 and 50. In this manner, the ring gear 12 of assembly 30 can be driven in rotation as it receives power transmitted from two motors not shown to the shafts 17 of each of the assemblies 40 and 50, respectively. In this way a cascade gear-down is obtained between these input shafts of assemblies 40, 50 and the output shaft 10 of assembly 30.

Since no axial thrusts exist along shafts 17, 22 and 10, no ball bearings are needed and only roller bearings are required.

Figure 3:
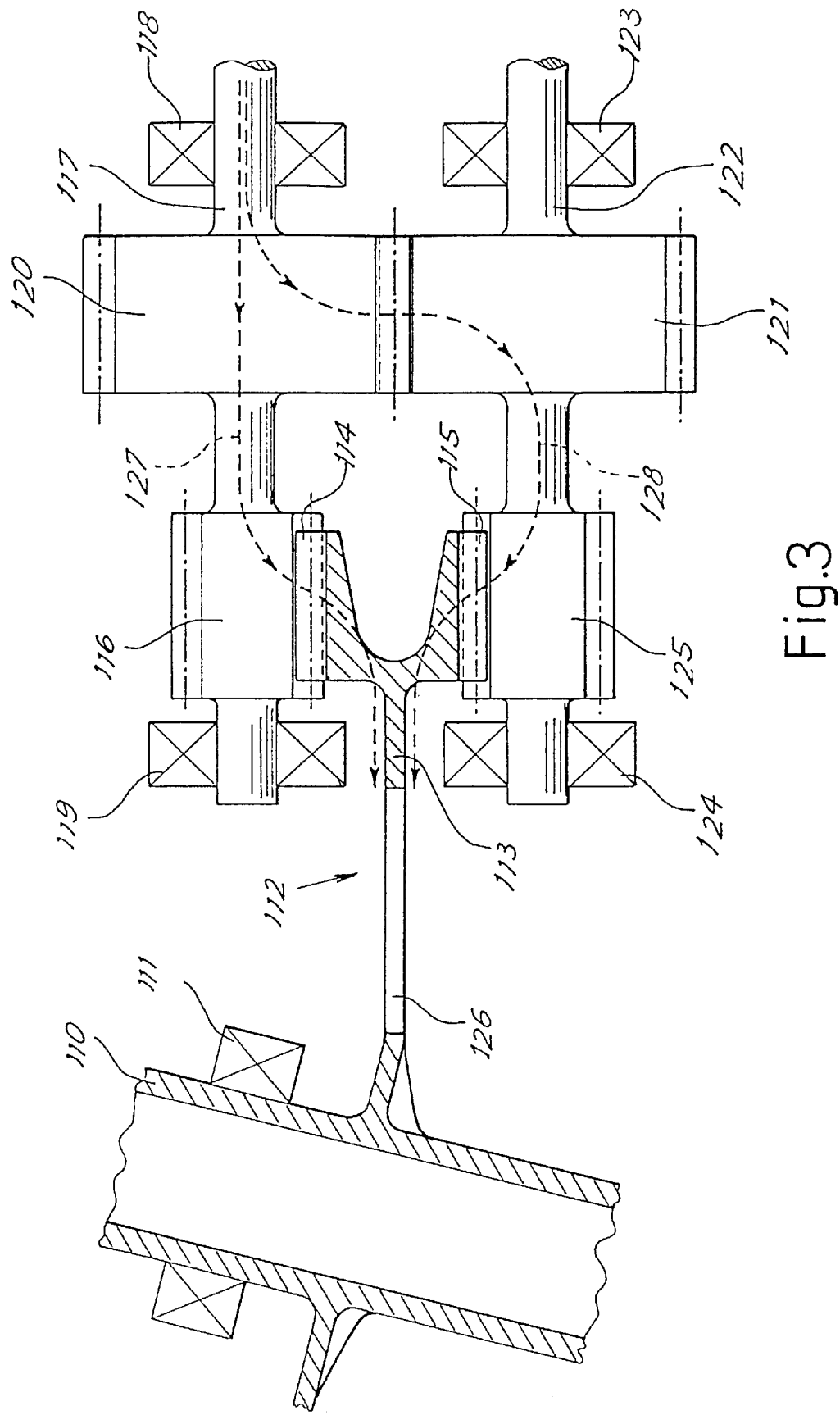
FIG. 3 is an alternative embodiment of the driving gear in accordance with the invention.

The preceding embodiment is preferred due to its flexibility qualities. The axes of pinions and shaft of the ring gear however must not necessarily be perpendicular to each other. For example, shown in FIG. 3 is an alternative embodiment, substantially similar to the one in FIG. 1 but with oblique axes. Elements similar to those in FIG. 1 are denoted by the same reference numerals increased by 100. Therefore, there is a shaft 110, supported by bearings 111 and carrying a bevel ring gear 112 with a flexible wall 113 provided with lightening elements 126. The ring gear terminates with a double toothing 114, 115 for meshing with pinions 116, 125 supported by parallel shafts 117, 122 rotating in bearings 118, 119, 123, 124. Shafts 117, 122 are interconnected by a driving gear 120, 121. The movement force imparted to a shaft 117 is divided into 127 and 128 to be joined again in the ring gear 112, in the same manner as above explained.

While embodiments having the pinion axes intersecting the shaft 10, 110 axes are preferred, due to their simplicity, pinions and ring gear can be conceived for an oblique fitting, i.e. with the pinion axes that do not intersect the shaft 110, should this be deemed useful for a particular application.

What is claimed is:

1. A gear-drive assembly between an input shaft and an output shaft comprising:

a ring gear having two faces and a peripheral portion carrying corresponding and opposite toothings on the two faces thereof, one pinion of a pair of pinions, carried by parallel shafts interconnected with each other by a driving gear for rotating at the same speed and in opposite ways:. meshing with each toothing, each pinion having a respective pinion axis, one of said parallel shafts being the input shaft, and the ring gear being carried by the output shaft in a floating manner for varying the distance of its toothings from the pinion axis, wherein the toothings of the ring gear are face gears and the pinions meshing therewith are cylindrical pinions.

2. A gear-drive assembly as claimed in claim 1, wherein a yielding element is interposed between the peripheral portion of the ring gear carrying the toothings and the shaft for supporting the peripheral portion of the ring gear in a floating manner.

3. A gear-drive assembly as claimed in claim 2, wherein the yielding element is an elastically yielding element.

4. A gear-drive assembly as claimed in claim 3, wherein the ring gear has a disc-shaped body, and the disc-shaped body of the ring gear comprises an elastically yielding element.

5. A gear-drive assembly as claimed in claim 1, wherein the driving gear for transmission between the two parallel shafts carrying the pinions comprises a pair of mutually-meshing gears each integral with one of the shafts.

6. A gear-drive assembly as claimed in claim 1, wherein the input shaft and the output shaft are perpendicular to each other.

7. A gear-drive assembly as claimed in claim 1, wherein the driving gear for transmission between the two parallel shafts carrying the pinions consists of a pair of mutually-meshing gears each integral with one of the shafts.

8. A gear-drive assembly as claimed in claim 1, wherein toothings, of each ring gear face, perpendicularly face the cylindrical pinions, respectively, when the respective face gear and pinion mesh, and the cylindrical pinions have toothings which face perpendicularly to each ring gear face, respectively when the respective face gear and pinion mesh.

9. A gear-drive assembly as claimed in claim 1, wherein the toothings of each ring face perpendicularly extend from each face in a direction parallel to a longitudinal axis of the output shaft.

10. A gear-drive assembly between an input shaft and an output shaft comprising:

a ring gear having two faces and a peripheral portion carrying corresponding and opposite toothings on the two faces thereof one pinion of a pair of pinions carried by parallel shafts interconnected with each other by a driving gear for rotating at the same speed and in opposite ways meshing with each toothing, each pinion having a respective pinion axis one of said parallel shafts being the input shaft and the ring gear being carried by the output shaft in a floating manner for varying the distance of its toothings from the pinion axis, wherein the ring gear has face gears meshing with said pinions and has a conical web, such that the web of the ring gear has a beveled shape.

11. A gear-drive assembly as claimed in claim 10, wherein a yielding element is interposed between the peripheral portion of the ring gear carrying the toothings and the shaft for supporting the peripheral portion of the ring gear in a floating manner.

12. A gear-drive assembly as claimed in claim 11, wherein the yielding element is an elastically yielding element.

13. A gear-drive assembly as claimed in claim 12, wherein the ring gear has a disc-shaped body, and the disc-shaped body of the ring gear comprises an elastically yielding element.

14. A gear-drive assembly as claimed in claim 10, wherein the driving gear for transmission between the two parallel shafts carrying the pinions comprises a pair of mutually-meshing gears each integral with one of the shafts.

15. A gear-drive assembly as claimed in claim 10, wherein the input shaft and the output shaft are perpendicular to each other.

16. A gear-drive assembly as claimed in claim 10, wherein the driving gear for transmission between the two parallel shafts carrying the pinions consists of a pair of mutually-meshing gears each integral with one of the shafts.

17. A gear-drive assembly as claimed in claim 10, wherein the pinions are cylindrical.

* * * * *